US012314013B1

(12) United States Patent
Violland

(10) Patent No.: US 12,314,013 B1
(45) Date of Patent: May 27, 2025

(54) BAND AIDE DEVICE

(71) Applicant: Eric Robert Violland, Lake Mary, FL (US)

(72) Inventor: Eric Robert Violland, Lake Mary, FL (US)

(*) Notice: Subject to any disclaimer, the term of this patent is extended or adjusted under 35 U.S.C. 154(b) by 469 days.

(21) Appl. No.: 17/866,551

(22) Filed: Jul. 18, 2022

Related U.S. Application Data

(60) Provisional application No. 63/268,279, filed on Feb. 21, 2022.

(51) Int. Cl.
*G04D 1/00* (2006.01)
*G04B 37/12* (2006.01)
*G04B 47/04* (2006.01)

(52) U.S. Cl.
CPC ............... *G04D 1/00* (2013.01); *G04B 37/12* (2013.01); *G04B 47/04* (2013.01); *G04B 47/046* (2013.01)

(58) Field of Classification Search
CPC .......... G04D 1/00; G04B 37/12; G04B 47/04; G04B 47/046; A44C 5/00
See application file for complete search history.

(56) References Cited

U.S. PATENT DOCUMENTS 4,396,298 A * 8/1983 Ripley ............... G04B 37/1486 968/452
5,206,841 A * 4/1993 Boucheron .......... G04B 37/005 368/283
5,631,879 A * 5/1997 Pequignet .......... G04B 37/1486 368/282
6,366,538 B1 * 4/2002 Anderson .............. G04B 47/00 368/10
7,410,073 B2 * 8/2008 Yuhara ................... A45D 33/18 220/729
8,388,218 B2 * 3/2013 Durpetti ................. A61K 33/26 368/283
10,140,628 B2 11/2018 Pradeep et al.
10,261,547 B1 * 4/2019 DiMeglio ............... G06F 1/163
10,264,029 B2 4/2019 Lajoie et al.
10,523,350 B1 12/2019 Harvey et al.
10,656,752 B1 5/2020 Smith
10,902,852 B2 1/2021 Tran et al.
11,115,230 B2 9/2021 Shribman et al.
11,147,443 B2 10/2021 Tesar
11,184,708 B2 11/2021 Carrigan et al.
11,184,930 B2 11/2021 Lim et al.
(Continued)

*Primary Examiner* — Edwin A. Leon
*Assistant Examiner* — Jason M Collins
(74) *Attorney, Agent, or Firm* — Terry M. Sanks, Esq.; Beusse Sanks, PLLC

(57) ABSTRACT

A band aide device for a watch with wristbands and band release buttons, includes a first section having a first hinge element and a first finger tab diametrically opposing the first hinge element. The device includes a second section having a second hinge element and a second finger tab diametrically opposing the second hinge element. The device includes a first prong and a second prong in spaced relation from the first prong. The first and second prongs depend from an interior surface of the first section and being arranged to align with the band release buttons. To move the first and second sections in a closed state around a watch-face of the watch, or when applying pressure to at least the first finger tab in a direction of the watch, pressure is applied to the band release buttons to simultaneously release the wristbands.

20 Claims, 5 Drawing Sheets

500

(56) References Cited

U.S. PATENT DOCUMENTS

| | | | | |
|---|---|---|---|---|
| 11,422,507 | B2 * | 8/2022 | Wang | G04B 37/22 |
| 11,947,317 | B1 * | 4/2024 | Chen | G04B 37/005 |
| 2011/0014956 | A1 * | 1/2011 | Lee | G06F 1/163 455/569.1 |
| 2014/0337621 | A1 * | 11/2014 | Nakhimov | H04W 12/068 713/168 |
| 2016/0357158 | A1 * | 12/2016 | Kim | G04G 21/06 |
| 2018/0055159 | A1 * | 3/2018 | Park | A44C 5/18 |

* cited by examiner

500

BAND AIDE DEVICE

CROSS-REFERENCE TO RELATED APPLICATIONS

This application claims the benefit of U.S. Provisional Application No. 63/268,279 filed Feb. 21, 2022, which is incorporated herein by reference in its entirety.

BACKGROUND

APPLE® watches are made to remove the original wristbands. This allows users to buy whatever design wristband they want and replace the original wristbands. The APPLE® watch includes slots where the ends of the wristbands are secured. The watch includes a pair of release buttons, each for a respective one wristband. Pressing the release button allows the wristband to be unlocked or released for removal. The user then slides into the slot the new wristband until locked or secured.

For some users, actuating the release button can be a challenge. Moreover, if a user uses a pin or pencil or pen tip, eventually, the release button may be damaged.

In view of the above, there is a need to address these challenges for removing wristbands from watches to wristband release buttons.

BRIEF SUMMARY

In one aspect, a band aide device, for a watch with wristbands and band release buttons, includes a first section having a first hinge element and a first finger tab diametrically opposing the first hinge element. The device includes a second section having a second hinge element and a second finger tab diametrically opposing the second hinge element. The device includes a first prong and a second prong in spaced relation from the first prong. The first and second prongs depend from an interior surface of the first section and being arranged to align with the band release buttons. To move the first and second sections in a closed state around a watch-face of the watch, pressure is applied to at least the first finger tab in a direction of the watch, which applies pressure to the band release buttons to simultaneously release the wristbands.

In one aspect, a device for a watch with wristbands and band release buttons, the device includes a first section including a body that includes a first side, a second side, a third side and a fourth side, a first hinge element coupled to the first side, a first prong, and a second prong in spaced relation from the first prong, a second section including a body that includes a first side, a second side, a third side and a fourth side, a watch-face frame cover integrated in the body, a second hinge element coupled to the first side, and at least one cavity formed in the frame cover for placement of a control element of the watch, the first and second sections being hingedly coupled together to move between an open state and a closed state such that in the closed state the first prong and second prong simultaneously apply pressure to the release buttons to release the wristbands.

A method includes installing a band aide device on a watch-face of a watch, closing first and second sections of the device around the watch-face, and simultaneously releasing the band release buttons with first and second prongs on the first section as a result of closing of the device.

Other technical features may be readily apparent to one skilled in the art from the following figures, descriptions, and claims.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
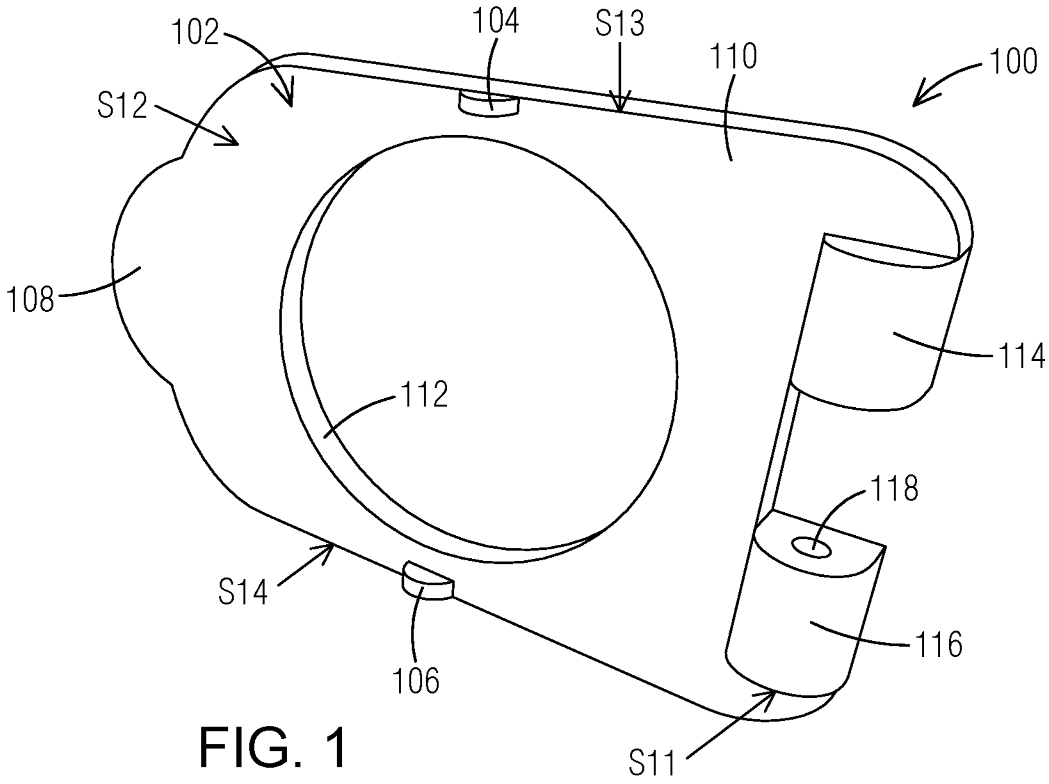
FIG. 1 illustrates a perspective view of a first or interior side of a first section of band aide device in accordance with one embodiment.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Figure 2:
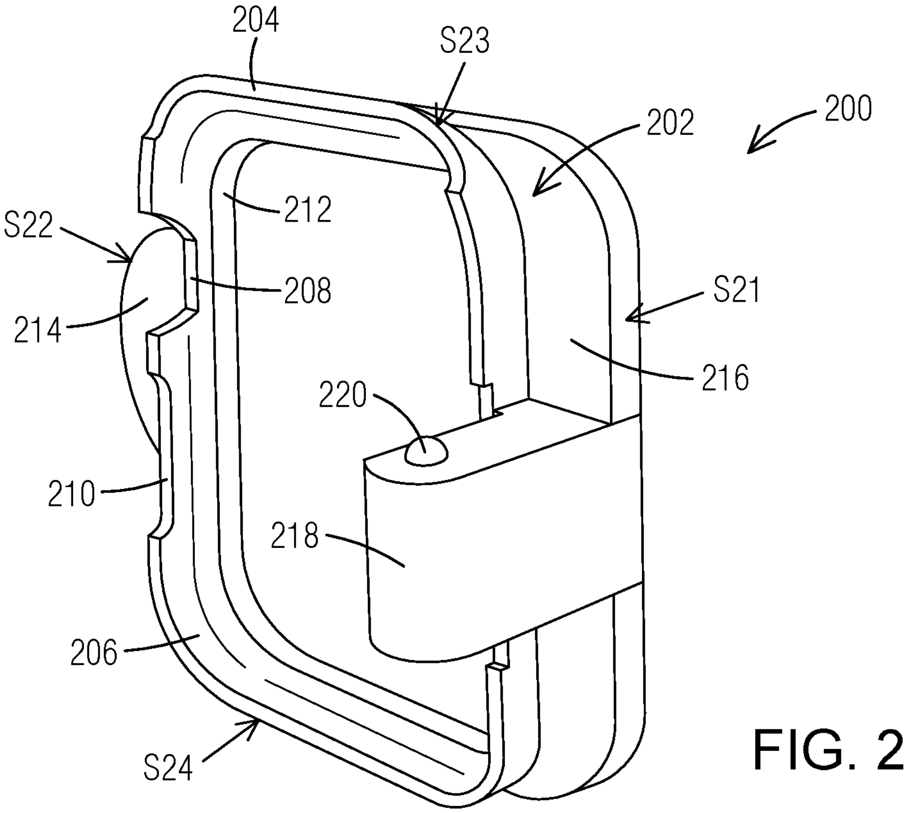
FIG. 2 illustrates a perspective view of a first or interior side of a second section of band aide device in accordance with one embodiment.

The device is constructed as two halves that are pressed together by a user to release the bands of an APPLE® watch simultaneously. The two halves, as shown in FIGS. 1 and 2, are joined on one side to allow them to fold up and down. The halves are designed to hold the APPLE® watch securely to allow the Band Aide prongs to depress the APPLE® watch band release buttons. This allows the user to quickly remove the existing bands and replace them.

The band aide device allows the user to easily remove the APPLE® watch bands without disturbing the watch face or inadvertently pressing buttons on the side of the watch.

FIG. 1 illustrates a perspective view of a first or interior side of a first section 100 of band aide device in accordance with one embodiment. The first section 100 may include a body 102 that includes a first side S11, a second side S12, a third side S13 and a fourth side S14. The first section 100 may include a first hinge element 114, 116 coupled to the first side S11. The first section 100 may include a first prong 104 and a second prong 106 in spaced relation from the first prong 104. The first prong 104 may be essentially flush with or in proximity to an edge of the third side S13. The second prong 106 may be essentially flush with or in proximity to an edge of the fourth side S14.

The first hinge element 114, 116 may be a female hinge assembly including first and second hinge portions separated with a gap therebetween. Each of the first and second hinge portions (i.e., hinge elements 114, 116) includes a rotation indention 118.

The body 102 may include a tab 108 integrated in the second side S12. The second side S12 diametrically opposes the first side S11 of the first section and extends past a watch-face perimeter of the watch 300A, 300B, shown in FIG. 3A. As will be described later, the tab 108 extends past the watch face. This may allow the surface of the tab 108 to conceal the watch control button 312 and/or dial 310 (FIG. 3A) so that they are not inadvertently engaged with the user's fingers or hand.

Figure 4A:
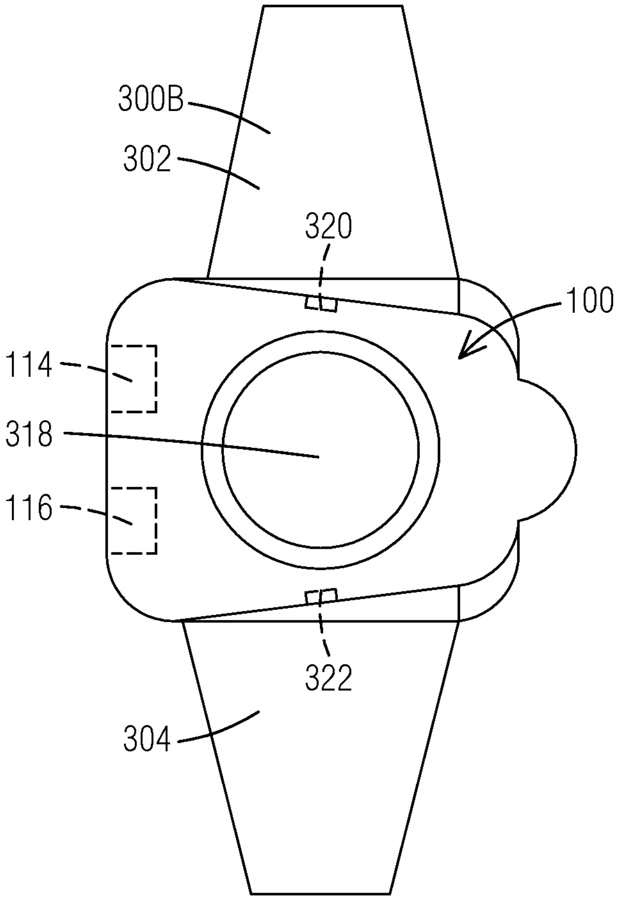
FIG. 4A illustrates a top view of a second or exterior side of the first section installed on the watch 300B in accordance with one embodiment.

The body 102 of the first section 100 further includes a planar substrate 110 bounded by the first, second, third and fourth sides S11, S12, S13 and S14 and having a hole 112 through a center of the planar substrate 110. As shown in FIG. 4A, the hole 112 surrounds at least one of the battery charger and the sensor, denoted in a dash, dot, dot line, of the watch 300B.

FIG. 2 illustrates a perspective view of a first or interior side of a second section 200 of band aide device in accordance with one embodiment. The second section 200 may include a body 202 that includes a first side S21, a second side S22, a third side S23 and a fourth side S24. The second section 200 may include a watch-face frame cover 204 integrated in the body 202.

The second section 200 may include a second hinge element 218 coupled to an extension surface 216 extending from the frame cover and to the first side S21. The second section 200 may include at least one cavity 208, 210 formed in the frame cover 204 for placement of a control element of the watch. The first and second sections 100 and 200 are hingedly coupled together to move between an open state and a closed state such that in the closed state the first prong 104 and second prong 106 simultaneously apply pressure to the release buttons 320, 322 of FIG. 3B to release the wristbands 302, 304.

The watch-face frame cover 204 includes sidewalls configured to wrap around at least a portion of sides of a watch-face perimeter. The at least one cavity 208, 210 formed in the frame cover includes a rotatable dial cavity 208 and a control button cavity 210.

The second hinge element 218 is a male hinge assembly. The male hinge assembly is received between the first and second hinge portions (i.e., hinge element 114, 116), shown in FIG. 1. The second hinge element 218 may include a snap-on connector 220 dimensioned to snap into the rotation indention 118. The snap-on connector 220 rotates in the rotation indention 118 and provides a center axis of rotation. In some embodiments, the snap-on connector 220 may be substituted with a pivot pin that would pass through the first and second hinge portions and the male hinge assembly.

The body 202 of the second section 200 may include a tab 214 integrated in the second side S22. The second side S22 diametrically opposes the first side S21 and extends past a watch-face perimeter of the watch. The second side S22 is closer in proximity to the side of the watch-face frame cover 204 with the at least one cavity 208, 210. The frame cover 204 may include an inner perimeter edge 212. This may allow the surface of the tab 214 to conceal and protect the watch control button 312 and/or dial 310 (FIG. 3A) so that they are not inadvertently engaged with the user's fingers or hand during operation.

The first and second sections 100 and 200 are two interconnected halves or portions that rotate to a closed state, which tabs to allow prongs to simultaneously apply a force of pressure to unlock the watchbands.

When installing the applying pressure with a finger or thumb to the tab causes the body of the second section to rotate about the he first hinge element relative to the second hinge element. The tabs also allow the watch's controls to be concealed and/or protected.

Figure 3A:
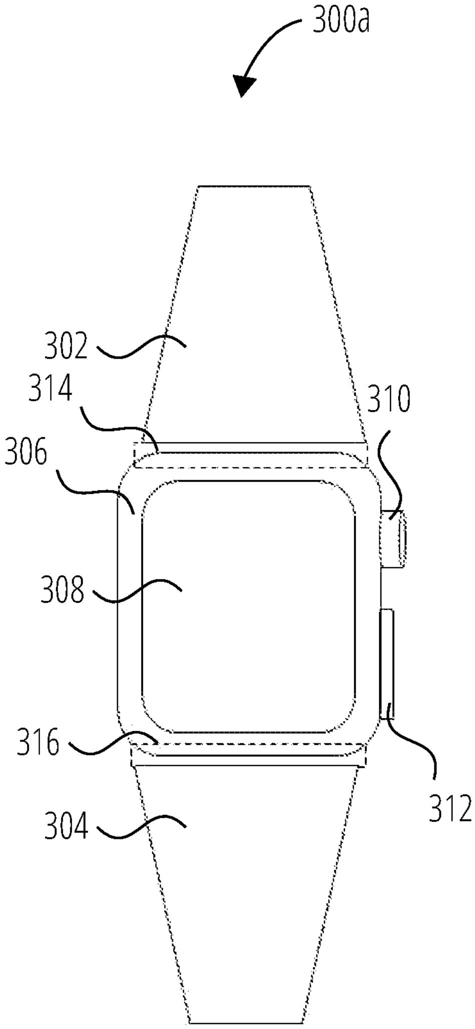
FIG. 3A PRIOR ART
FIG. 3A illustrates an example top view of an APPLES® watch with removable wristbands in accordance with one embodiment.

FIG. 3A illustrates an example top view of a conventional watch, denoted as 300A, with removable wristbands 302, 304 in accordance with one embodiment. The watch of this example is an APPLE® watch 44 Millimeter of Series SE and 4-6, for example. The band aide device 100, 200 may be usably with other series APPLE® watches from the past or future. The band aide device may be used for any APPLE® watch series or other watches with release buttons 320, 322, as shown in FIG. 3B, on the back face of the watch.

The watch includes a watch face 308 and control dial 310 and a control button 312. The control dial 310 and a control button 312 may be concealed between the two sections 100 and 200, when closed. The control dial 310 and the control button 312 may be placed in cavities 208 and 210, respectively. The watch face 308 may include an outer surface 306.

Each wristband 302, 304 includes a watch-face interface 314, 316, denoted in dashed lines. The interfaces 314, 316 are adapted to slide in and out of the slots in the sides of the watch face 308. The interfaces 314, 316 are engaged by the release buttons 320, 322 to lock the wristbands 302, 304 and unlock wristbands 302, 304, such as by depressing the release buttons 320, 322.

Figure 3B:
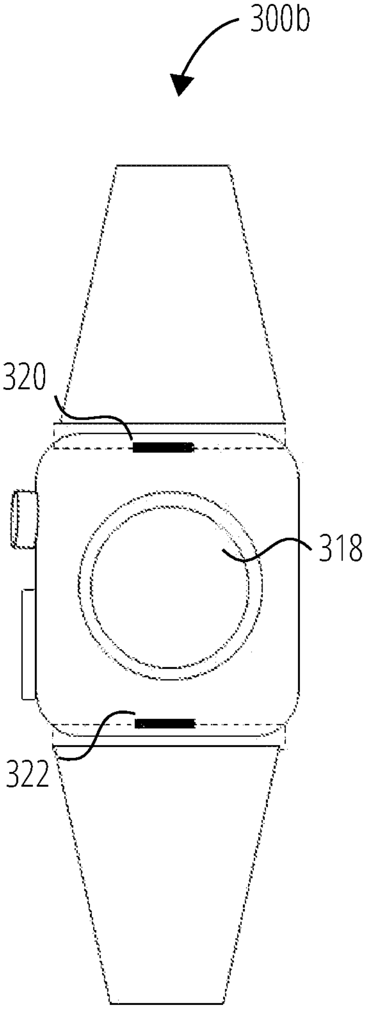
FIG. 3B PRIOR ART
FIG. 3B illustrates an example bottom view of the APPLE® watch of FIG. 3A in accordance with one embodiment.

FIG. 3B illustrates an example bottom view of the conventional watch 300*b* of FIG. 3A in accordance with one embodiment. The watch 300*b* includes at least one of a battery charger 318 and sensor on a back surface of the watch. The release buttons 320, 322 are accessible from the back surface of the watch. The release buttons 320, 322 when pressed release wristbands 302, 304, individually. In general, it is impossible to release the wristbands 302, 304, simultaneously, unless the band aide device is used.

It should be understood that users may install a watch cover over the front side of the watch face. In such a scenario, the band aide device may be sized for use with the watch face without an extra cover or with a watch face cover.

FIG. 4A illustrates a top view of a second or exterior side of the first section 100 installed on the watch 300B in accordance with one embodiment. The first section 100 is essentially the same as the first section 100 of FIG. 1, thus for the sake of brevity some of the difference will be described. The wristbands 302, 304 are denoted in dash, dot, dot lines. The release buttons 320, 322 are denoted in dashed lines. The first hinge element 114, 116 is shown in dashed lines. The watch's at least one of a battery charger 318 and sensor on a back surface of the watch 300B is denoted in a dash, dot, dot line.

Figure 4B:
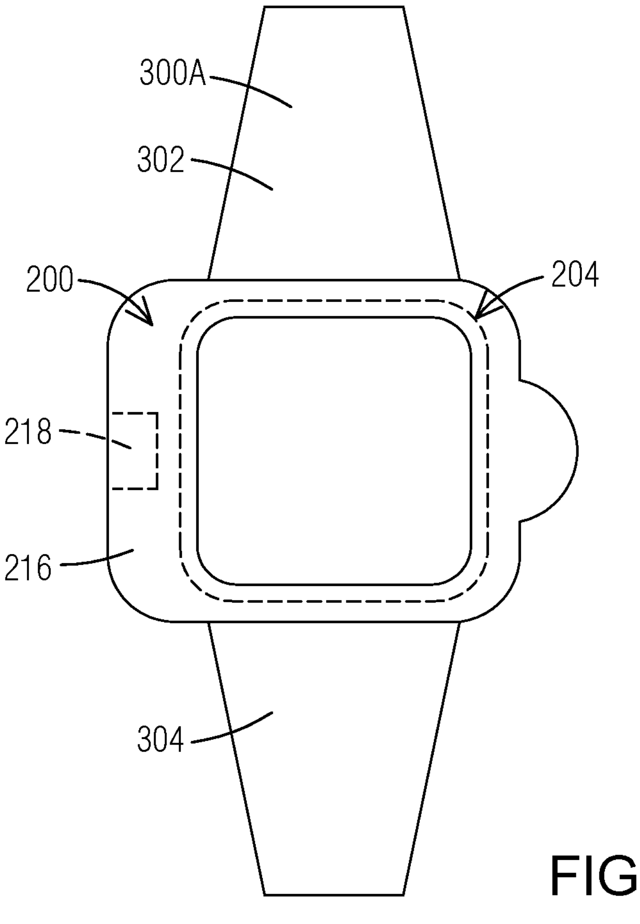
FIG. 4B illustrates a top view of a second or exterior side of the second section 200 install on the watch 300A in accordance with one embodiment.

FIG. 4B illustrates a top view of a second or exterior side of the second section 200 installed on the watch 300A in accordance with one embodiment. The second section 200 is essentially the same as the second section 200 of FIG. 2, thus for the sake of brevity some of the difference will be described. The wristbands 302, 304 are denoted in dash, dot, dot lines. The second hinge element 218 is denoted in dashed lines. The watch-face frame cover 204, denoted in dashed lines, includes sidewalls configured to wrap around at least a portion of sides of a watch-face perimeter.

Figure 5:
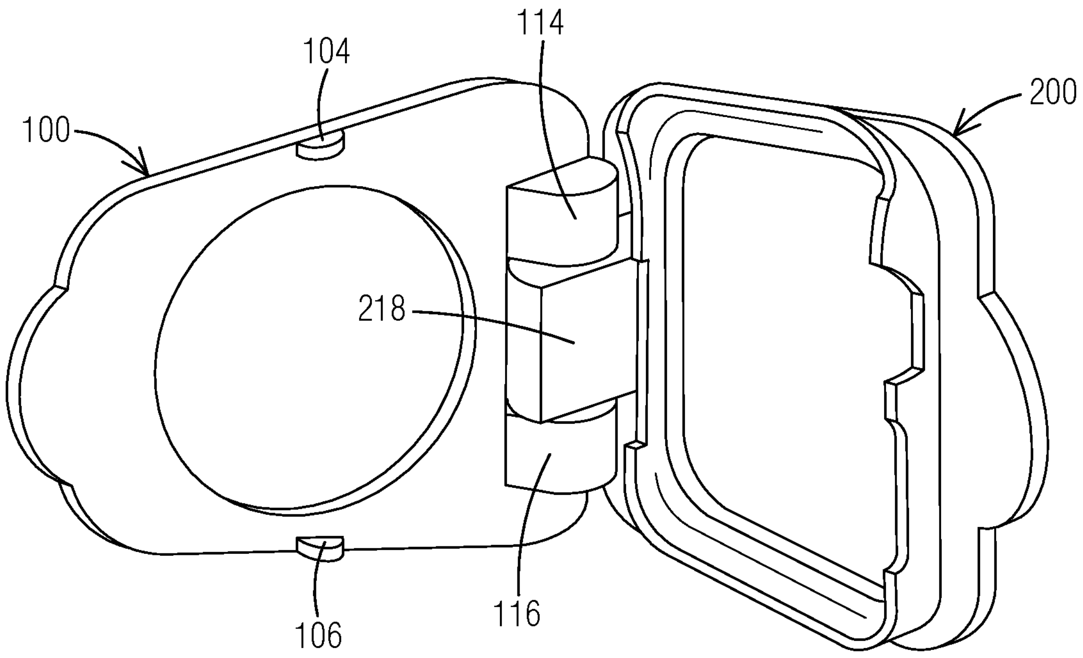
FIG. 5 illustrates a perspective view of the band aide device in accordance with some embodiment.

FIG. 5 illustrates a perspective view of the band aide device 500 in accordance with some embodiment. The first and second sections 100 and 200 (FIGS. 1 and 2) are two interconnected halves or portions that rotate to in an open state. The first hinge element 114, 116 is shown mated with the second hinge element 218. The first prong 104 and second prong 106 are shown on an interior surface of the first section 100.

Figure 6:
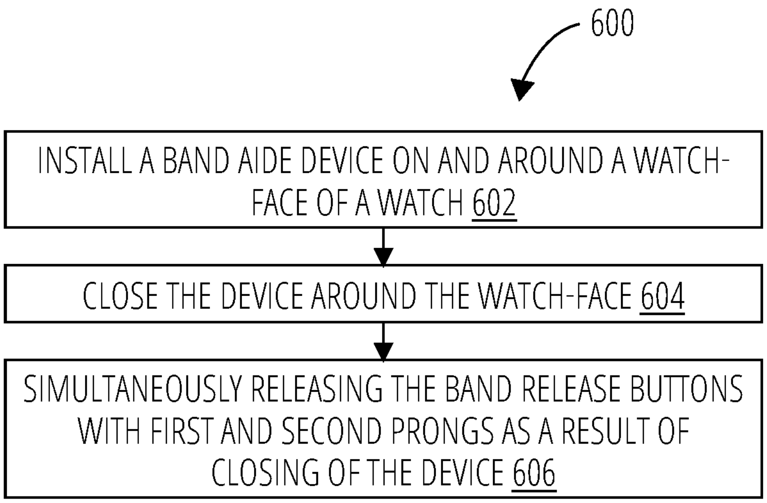
FIG. 6 illustrates a flowchart of method for releasing watch bands in accordance with one embodiment.

FIG. 6 illustrates a flowchart of method 600 for releasing watch bands in accordance with one embodiment. In block 602, method 600 installs the band aide device on and around a watch-face of a watch. In block 604, method 600 closes the device around the watch-face. In block 606, method 600 simultaneously releases the band release buttons with first and second prongs as a result of closing of the device.

The method may include pressing on tabs of the first and second sections of the device together to fully close the device; and during the pressing, applying pressure on the band release button by the first and second prongs, simultaneously.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

The invention claimed is:

1. A device for a watch with wristbands and band release buttons, the device comprising:

a first section having a first hinge element;

a second section having a second hinge element; and a first prong and a second prong in spaced relation from the first prong, the first and second prongs depend from an interior surface of the first section and being arranged to align with the band release buttons, and when the first and second sections are in a closed state around a watch-face of the watch or when applying pressure to at least one of: a distal portion of an exterior side of the first section and a distal portion of an exterior side of the second section in a direction of the watch, the first and second prongs apply pressure to the band release buttons to simultaneously release the wristbands.

2. The device of claim 1, wherein:

the first section further includes:

a first body that includes a planar substrate and hole through a center of the planar substrate; and the second section further includes:

a second body, a watch-face frame cover integrated in the second body, and at least one cavity formed in the frame cover for placement of a control element of the watch, the first and second sections being hingedly coupled together to move between an open state and the closed state such that in the closed state the first prong and second prong simultaneously apply pressure to the release buttons to release the wristbands.

3. The device of claim 2, wherein:

the watch includes at least one of a battery charger and sensor on a back surface of the watch; and the hole configured to surround the at least one of the battery charger and the sensor.

4. The device of claim 2, wherein the at least one cavity formed in the frame cover includes a rotatable dial cavity and a control button cavity.

5. The device of claim 2, wherein the watch-face frame cover comprises sidewalls configured to wrap around at least a portion of sides of a watch-face perimeter.

6. The device of claim 2, wherein:

applying pressure to a distal portion of an exterior side of the first body causes the first body to rotate about the first hinge element relative to the second hinge element.

7. The device of claim 6, wherein:

applying pressure to a distal portion of an exterior side of the second body causes the second body to rotate about the first hinge element relative to the second hinge element.

8. The device of claim 1, wherein:

the first hinge element is a female hinge assembly including first and second hinge portions separated with a gap therebetween; and the second hinge element is a male hinge assembly, the male hinge assembly being received between the first and second hinge portions.

9. A method comprising:

installing a device of claim 1, on a watch-face of a watch;

closing first and second sections of the device around the watch-face; and simultaneously releasing the band release buttons with first and second prongs of the first section as a result of closing of the device.

10. The method of claim 9, further comprising:

pressing on the first and second sections of the device together to close the device; and during the pressing applying pressure on the band release buttons by the first and second prongs.

11. The device of claim 1, wherein the first section further comprises a first finger tab diametrically opposing the first hinge element and the second section further comprises a second finger tab diametrically opposing the second hinge element.

12. A device for a watch with wristbands and band release buttons, the device comprising:

a first section including:

a body that includes a first side, a second side, a third side and a fourth side, a first hinge element coupled to the first side, a first prong, and a second prong in spaced relation from the first prong; and a second section including:

a body that includes a first side, a second side, a third side and a fourth side, a watch-face frame cover integrated in the body, a second hinge element coupled to the first side, and at least one cavity formed in the frame cover for placement of a control element of the watch, the first and second sections being hingedly coupled together to move between an open state and a closed state such that in the closed state the first prong and second prong simultaneously apply pressure to the release buttons to release the wristbands.

13. The device of claim 12, wherein the body of the first section further includes a planar substrate bounded by the first, second, third and fourth sides and hole through a center of the planar substrate.

14. The device of claim 13, wherein:

the watch includes at least one of a battery charger and sensor on a back surface of the watch; and the hole surrounding the at least one of the battery charger and the sensor.

15. The device of claim 12, wherein the at least one cavity formed in the frame cover includes a rotatable dial cavity and a control button cavity.

16. The device of claim 15, wherein the watch is a smart watch.

17. The device of claim 12, wherein the watch-face frame cover comprises sidewalls configured to wrap around at least a portion of sides of a watch-face perimeter.

18. The device of claim 12, wherein:

the first hinge element is a female hinge assembly including first and second hinge portions separated with a gap therebetween; and the second hinge element is a male hinge assembly, the male hinge assembly being received between the first and second hinge portions.

19. The device of claim 12, wherein:

the body of the first section includes a tab integrated in the second side of the first section, the second side being diametrically opposing the first side of the first section and extends past a watch-face perimeter of the watch; and applying pressure with a finger or thumb to the tab causes the body of the first section to rotate about the first hinge element relative to the second hinge element.

20. The device of claim 12, wherein:

the body of the second section includes a tab integrated in the second side of the second section, the second side being diametrically opposing the first side of the second section and extends past a watch-face perimeter of the watch; and applying pressure with a finger or thumb to the tab causes the body of the second section to rotate about the first hinge element relative to the second hinge element.

* * * * *